July 2, 1963  E. A. BLAIR  3,096,379
PREPARATION OF TETRAFLUOROETHYLENE
Filed Nov. 30, 1960
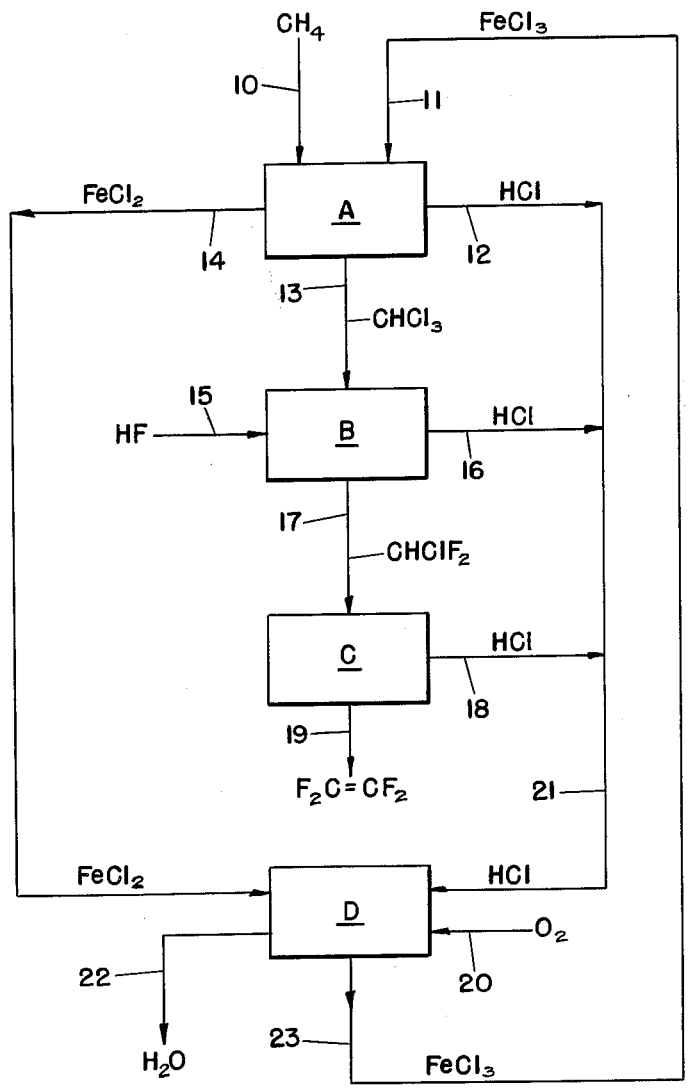
INVENTOR.
EDGAR ALLAN BLAIR
BY
Robert O. Spindle
ATTORNEY

United States Patent Office 3,096,379
Patented July 2, 1963

3,096,379
PREPARATION OF TETRAFLUOROETHYLENE
Edgar Allan Blair, Drexel Hill, Pa., assignor to Sun Oil Company, Philadelphia, Pa., a corporation of New Jersey
Filed Nov. 30, 1960, Ser. No. 72,613
4 Claims. (Cl. 260—653.3)

This invention relates to the preparation of tetrafluoroethylene utilizing methane as the material which provides the carbon and hydrogen fluoride as the material providing the fluorine.

According to the invention, methane is reacted with a ferric halide, which can be either ferric chloride or ferric bromide and which for purpose of description is hereafter considered to be ferric chloride, under certain conditions to form chloroform ($CHCl_3$) and hydrogen chloride while converting the ferric chloride to ferrous chloride. The chloroform is then reacted with hydrogen fluoride under conditions which cause the formation of chlorodifluoromethane ($CHClF_2$) and an additional amount of hydrogen chloride. The so-formed chlorodifluoromethane is pyrolyzed to form tetrafluoroethylene and a further quantity of hydrogen chloride. The ferrous chloride formed in the first step is contacted with oxygen and with the hydrogen chloride recovered from the several steps in order to convert it back to ferric chloride which is then recycled to the chlorination step.

The reactions in the various steps of the process can be illustrated by the following equations:

$$12FeCl_3 + 2CH_4 \rightarrow 2CHCl_3 + 6HCl + 12FeCl_2$$

$$2CHCl_3 + 4HF \rightarrow 2CHClF_2 + 4HCl$$

$$2CHClF_2 \xrightarrow{\Delta} F_2C=CF_2 + 2HCl$$

$$12FeCl_2 + 12HCl + 3O_2 \rightarrow 12FeCl_3 + 6H_2O$$

From these equations it can be seen that tetrafluoroethylene is produced without any consumption of chlorine in the process, as the HCl released in the first three steps is used to re-form $FeCl_3$ which is recycled. The only materials consumed in the process, other than oxygen which can be supplied as air, are methane and hydrogen fluoride.

The invention is more specifically described in conjunction with the accompanying drawing which schematically illustrates the process.

Referring to the drawing, the chlorination step is carried out in reaction zone A. The methane fed from line 10 is contacted with ferric chloride from recycle line 11 at a temperature in the range of 220–375° C., more preferably 250–360° C. The ferric chloride can be in a solid, liquid or vapor form but preferably is in vapor state at a temperature above its normal boiling point (315° C.). It is important for obtaining the best yield of chloroform to maintain a molar ratio of ferric chloride to methane fed to zone A in a range of 0.3:1 to 2.5:1. At ratios above 2.5 carbon tetrachloride tends to be produced in large yield, while at ratios less than 0.3 the yield of chloroform is too low. Substantial yields of chloroform are obtained at ratios in the specified range, although the other chloromethanes generally are also produced in various amounts. Chloromethanes lower than $CHCl_3$ may be recycled to the chlorination step. Typical product compositions for different ferric chloride to methane ratios at a reaction temperature of 355° C. and a residence time in zone A of 1.25 hours are as follows:

| $FeCl_3$:$CH_4$ Ratio | $CH_3Cl$, percent | $CH_2Cl_2$, percent | $CHCl_3$, percent | $CCl_4$, percent |
|---|---|---|---|---|
| 0.11 | 79 | 21 | | |
| 0.34 | 52 | 35 | 13 | |
| 1.00 | 43 | 32 | 19 | 6 |
| 1.90 | 30 | 28 | 27 | 15 |
| 2.40 | 25 | 23 | 24 | 28 |

From the reaction product of zone A HCl and chloroform are separately recovered as indicated by lines 12 and 13, respectively. The other chloromethanes produced generally will also be separately recovered and used for other purposes or further chlorinated. The ferrous chloride which is formed by the reaction in zone A is removed as indicated by line 14.

The chloroform produced in zone A is reacted in zone B with hydrogen fluoride which is fed thereto as indicated by line 15. Zone B can be in the form of a tubular reactor through which the reactants continuously pass. The general temperature range for the reaction is 250–550° C. and pressures can range from atmospheric to 1000 p.s.i.g. or higher. The reaction can be conducted either with or without a catalyst, and the optimum reaction temperature will depend upon whether or not a catalyst is present and the particular catalyst used. In the absence of a catalyst the temperature generally should be in the range of 450–550° C., more preferably, 475–510° C., and it is best to use an elevated pressure such as 500–1000 p.s.i.g. One suitable catalyst that can be used is activated carbon, in which case the optimum temperature is in the range of 400–500° C. It is distinctly preferred, however, to use as the catalyst ferric chloride distended on activated carbon and to employ temperatures in the range of 275–450° F. and pressures of 0–200 p.s.i.g.

The hydrogen fluoride and chloroform generally should be fed to zone B in a molar ratio of HF to $CHCl_3$ of from 1:1 to 4:1 and more preferably at about 2:1. In addition to the desired chlorodifluoromethane product, the monofluoro and trifluoro derivatives also are formed. Their formation can be minimized by appropriate adjustment of the HF to $CHCl_3$ molar ratio and of the reaction conditions within the ranges specified above. Hydrogen chloride is also formed in the reaction and is separately removed as indicated by line 16. The $CHClF_2$ is separated from the other products, as by distillation, and is passed to zone C as indicated by line 17.

In zone C, which can be in the form of a tubular reactor positioned in a furnace, the $CHClF_2$ is pyrolyzed at high temperature to produce the desired tetrafluoroethylene. The temperature for this reaction generally should be in the range of 650–850° C. It is preferred to carry out the reaction at about atmospheric pressure, since elevated pressures tend to cause the formation of reaction products which boil above tetrafluoroethylene (B.P.=−76.3° C.)

Hydrogen chloride formed in the pyrolysis and the desired tetrafluoroethylene are separately removed from zone C as indicated by lines 18 and 19, respectively.

The ferrous chloride produced in zone A is fed from line 14 to zone D where it is converted back to the ferric state. This is done by contacting the ferrous chloride with oxygen (air) introduced to zone D via line 20 and with the hydrogen chloride from zones A, B and C which is passed to zone D through line 21. Water which is formed as a by-product of the reaction is removed as indicated by line 22. The regenerated ferric chloride is recycled through lines 23 and 11 back to zone A for re-use.

From the foregoing description it can be seen that the present process permits the production of tetrafluoroethylene from methane and hydrogen fluoride. While in the preceding description the halogen of the iron compounds has been limited to chlorine, the process can also be practiced employing ferric bromide as the halogenating reagent and hence the bromide should be considered as equivalent to the chloride for the present purpose.

I claim:
1. Method of preparing tetrafluoroethylene which comprises: (1) contacting methane with a ferric halide selected from the group consisting of ferric chloride and ferric bromide at a temperature in the range of 220–375° C. and with a ferric halide: methane molar ratio of 0.3:1 to 2.5:1, whereby halogenation of the methane occurs and the ferric halide is reduced to ferrous halide; (2) separately recovering haloform and hydrogen halide from the reaction mixture; (3) reacting the haloform with hydrogen fluoride at a temperature in the range of 250–550° C. and with a hydrogen fluoride:methyl halide molar ratio of 1:1 to 4:1; (4) separately recovering monohalodifluoromethane and hydrogen halide from the reaction mixture; (5) pyrolyzing said monohalodifluoromethane at a temperature in the range of 650–850° C.; (6) separately recovering tetrafluoroethylene and hydrogen halide from the pyrolysis products; (7) contacting the ferrous halide with oxygen and with the hydrogen halide recovered in steps (2), (4) and (6) to re-form ferric halide; and (8) recycling the ferric halide to step (1).

2. Method according to claim 1 wherein the temperature in step (1) is in the range of 250–360° C.

3. Method according to claim 1 wherein the ferric halide is ferric chloride.

4. Method according to claim 3 wherein the reaction of step (3) is carried out in the presence of FeCl$_3$ supported on activated carbon and at a temperature in the range of 275–450° C.

References Cited in the file of this patent
UNITED STATES PATENTS
2,551,573   Downing et al. _____ May 8, 1951
FOREIGN PATENTS
428,445   Great Britain _____ Feb. 12, 1934